3,003,599
CONSTRUCTION ELEMENTS
George Alexis Rubissow, New York, N.Y., assignor to Industrial Development Co. (Establishment), Vaduz, Liechtenstein, a body corporate of Liechtenstein
Filed Feb. 27, 1956, Ser. No. 567,869
Claims priority, application France Mar. 2, 1955
1 Claim. (Cl. 189—34)

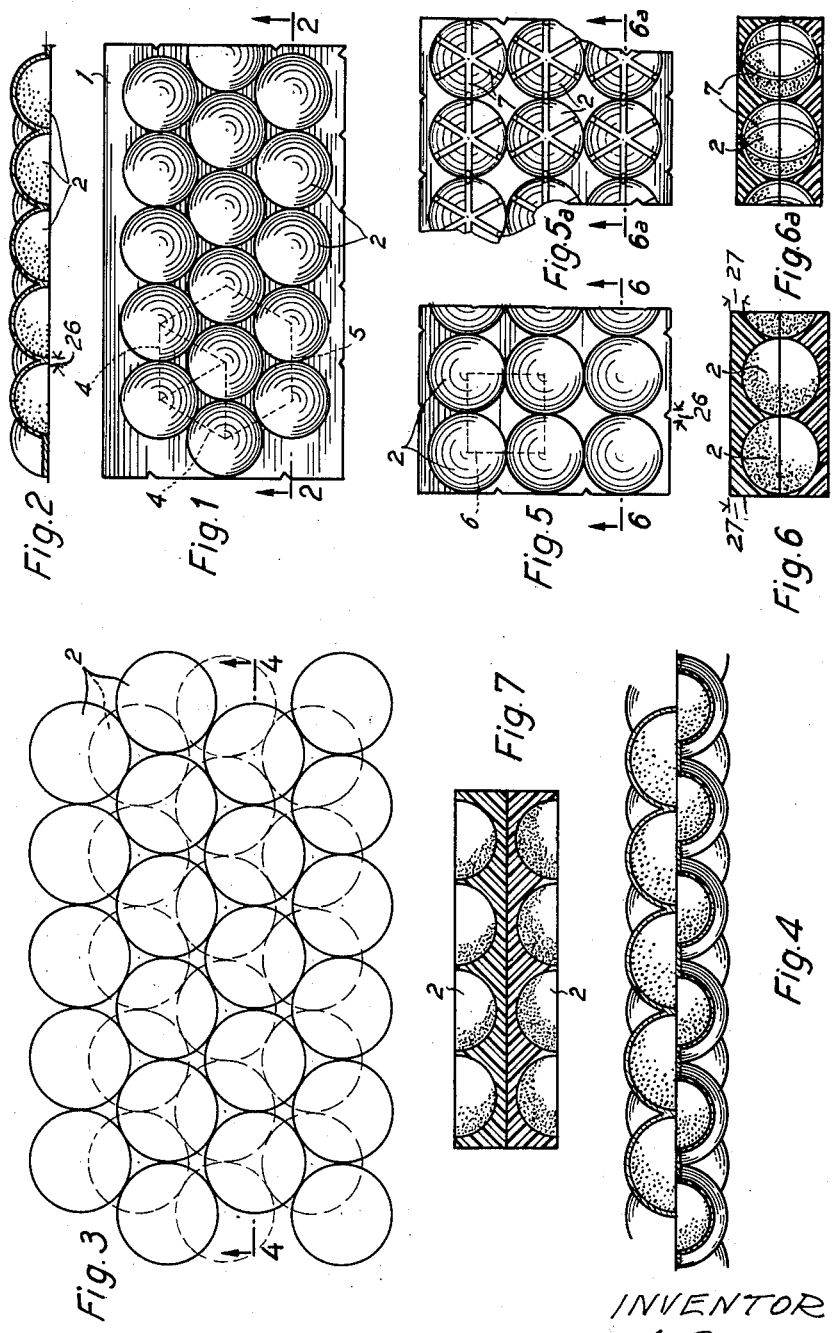
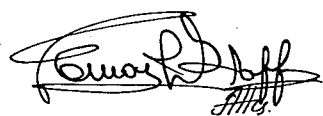

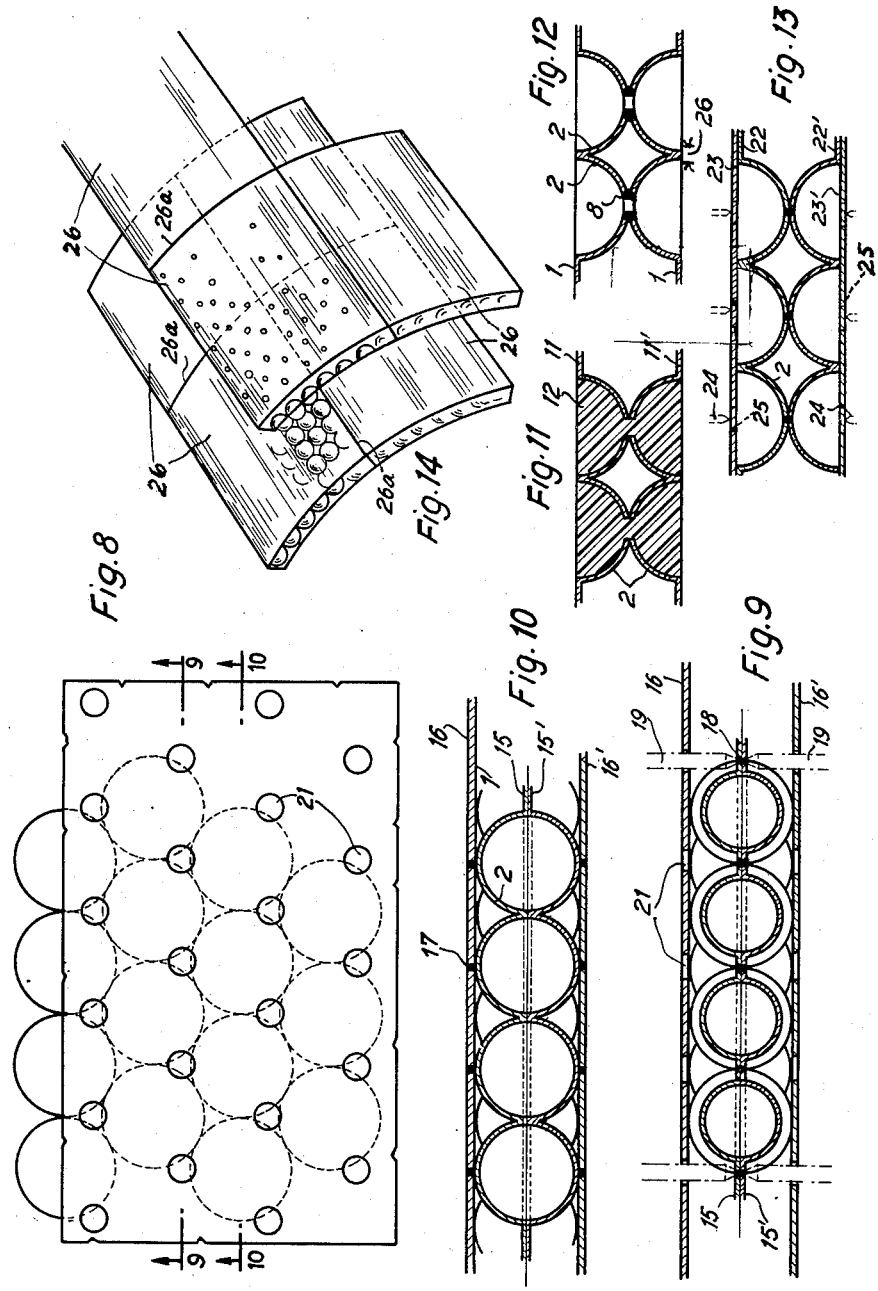

The present invention relates to a new structural element suitable for use in the construction of buildings, aircraft, submersible or non-submersible boats, sheeting and so forth.

The object of the invention is to produce an element of novel construction which renders it capable of effectively resisting alternating deflection or compression forces in both directions, and which also imparts thereto superior thermal insulating and soundproof qualities.

This result is obtained, according to the invention, by utilising a part of the high resistance to compression possessed by spherical caps. For this purpose two plates, having a large number of spherical caps, are assembled flat, one against the other. It may at once be mentioned that the two said plates may be assembled in different ways. Firstly, they may be applied one against the other in such a manner that the concave surfaces of the caps of one plate are turned towards the concave surfaces of the caps of the other plate, but they may also be applied one upon the other in such a manner that the spherical caps are opposed. It does not appear that the arrangement according to which the caps of the two plates are directed in the same direction, is of any interest, since it is more economical to produce directly a single plate of twice the thickness.

In each of the two solutions proposed, the caps of one plate may be placed just opposite the caps of the other plate, or on the contrary, they may be displaced relatively to the first ones. In this latter case, when care is taken to impart to the caps a suitable diameter and spacing, the capacities of all the caps can be made to communicate between themselves by a sinuous path which is favourable to soundlessness and thermal insulation.

These plates may be made of the most diverse materials such as, for example, metal, plastic material, wood, cement, plaster, clay soil, and produced by various processes such as pouring, casting, pressing, embossing, swaging, tooling by removing chips, or even by combined operations such as hot-stamping after casting.

According to one method of construction, reinforcing diametral ribs are provided in the interior of the caps.

According to another method of construction, two other smooth plates are secured to the outer faces of two assembled plates.

It will be understood that the general shape of all the plates it not limited to a plane shape; it may be of any other shape and for example, may form a portion of a cylindrical surface.

The invention will be more readily understood on consideration of the following specification and by examining the accompanying drawings which show, by way of example, some methods of construction of the invention.

In these drawings:

FIG. 1 shows, in front view, a portion of a thin plate provided with hemispherical recesses according to the invention.

FIG. 2 is a section on the line 2—2 of FIG. 1.

FIG. 3 shows, in front view, the association of two plates such as those in FIGS. 1 and 2.

FIG. 4 is a section on the line 4—4 of FIG. 3.

FIG. 5 shows, in front view, the association of two plates, of which the hemispherical recesses correspond with one another and are opposite to each other.

FIG. 6 is a section on the line 6—6 of FIG. 5.

FIG. 5a is a similar view to that of FIG. 5, of a modification in which the hemispherical vaults are ribbed.

FIG. 6a is a section following line 6a—6a of FIG. 5a.

FIG. 7 is a section similar to that of FIG. 6 but in which the hemispherical recesses correspond with each other and are located back to back.

FIG. 8 shows in front view, the association of two plates comprising spherical recesses with two other plane plates.

FIGS. 9 and 10 are respectively sections on the lines 9—9 and 10—10 of FIG. 8.

FIG. 11 shows in cross-section the association of two plates, the recesses of which are located back to back and drilled at the centre and are filled with a material forming an assembling rivet.

FIG. 12 shows, also in cross-section, a modification of an assembly of associated plates, as in FIG. 11.

FIG. 13 shows, also in cross-section, the association of two plates with hemispherical recesses in coincidence back to back, with two plane plates, and FIG. 14 shows the application of the princple of the invention to plates of general cylindrical shape.

Referring first to FIGS. 1 and 2, a relatively thin plate is shown, the surface of which is provided with cupolas or multiple juxtaposed recesses 2, in the shape of hemispherical cups.

The arrangement of these cupolas may be provided under various aspects. As shown in FIG. 1, they may be juxtaposed forming equilateral triangles 4, placed head to tail, or, in other words, having their crowns placed on the crowns of regular hexagons 5. In FIG. 5 is shown a modification in which the cupolas 2 are located at the crowns of squares 6, and it will be understood that any other arrangement may obviously be adopted, among others, arrangements in which the caps do not contact.

The thickness of said plates is variable according to the applications and according to the materials of which they are made: metal, plastic material, wood, cement, plaster and so forth.

They may be produced by various processes such as for example, by pouring, casting, pressing, stamping, swaging, tooling by removal of chips (for example drilling or reaming).

Combinations of these various processes may also be provided, such as for example, a casting followed by stamping, while the material is still hot.

Further, the shape of these cupolas is not limited to that of an hemispherical cap; they may be more or less deep for a given diameter of opening, and they may have, for example, the shape of a part of an ellipsoid of revolution.

Plates of this character present, in themselves, a high mechanical resistance, particularly to flexion, especially in the direction in which the material operates under compression.

The importance of these plates is further increased strongly when they are associated in pairs, flatwise, in such a manner that the cupolas are face to face (FIG. 6), or back to back (FIG. 7). In fact, when the adjacent surfaces of the two plates are welded or glued together, assemblies of plates of double thickness are obtained which effectively resist deflection forces in the two directions.

Further, when the concavities of the cupolas are face to face, assemblies of plates are obtained which further constitute very good thermal and soundproof insulators. The association of plates may also be effected in different ways, for example as shown in FIGS. 5 and 6, in which the concavities are in coincidence, or as indicated in FIGS. 3 and 4, where they overlap one another. In the particular example of FIGS. 3 and 4, each of the cupolas of each plate communicates with three cupolas of the other plate. Thus a continuous network of baffles is obtained over the whole area of the surface of the plates.

In all possible methods of construction, reinforcing ribs may also be provided in the interior of the cupolas as shown at 7, by way of example in FIGS. 5a and 6a, in which it is possible to see six radial ribs angularly equidistant in each of the cupolas 2.

It is also possible to envisage that the concave surface of the spheres is silvered, polished, metallized or covered with a reflecting or radiant paint for increasing their reflecting power.

Two metallic plates may be connected together by the crowns of their spherical caps located oppositely by solder points, for example with the interposition of a small ring 8 as shown in FIG. 12, by a known method of electric welding of metals.

In FIG. 11 is shown a modification in which two plates 11, 11', metallic for example, are coupled in such a manner that their spherical caps, drilled at their crowns, are opposite one another, a material 12, such as, for example, a plastic material, being poured into said caps. The filling thus effected produces a true riveting together of all the caps in pairs, which imparts to the assembly of the two plates thus formed a considerable solidity and eventually a predetermined elasticity according to the nature of the primary materials used.

In another method of construction, two plane plates are also secured to the outer faces of the assembly formed by two plates with caps assembled face to face or in opposition. In FIGS. 8 to 10 is shown an example of this character in which a first plate 15 of metal, provided with stamped caps 2, is soldered at points to a plane plate 16, for example on the crowns of the caps, as indicated at 17 in the drawing. A plate 15' identical with the plate 15 is similarly soldered on a plane plate 16'. The two assemblies of plates are then soldered, one to the other, by solder points 18 (FIG. 9), which form zones in the shape of curvilinear triangles determined, on the plates 15, 15', by stamped caps 2. To enable the electrodes 19 (FIG. 9) to reach these zones which are located in the interior of the assembly of the plates, holes 21 of a suitable diameter (see also FIG. 8) have been provided in the two plane plates 16, 16', just in front of the said curvilinear triangles. A very light assembly is thus obtained with smooth external faces and of an exceptional mechanical resistance.

In the method of construction in FIG. 13, the two plates 22, 22' are first soldered flat, that is to say with the zones of the curvilinear triangles defined by the spherical caps 2, on the plane plates 23 and 23' respectively, then the two assemblies are so located that the crowns of the caps 2 are in contact, and then they are soldered at these points of contact by means of electrodes 24 which may be introduced through holes 25 of suitable diameter provided in the plane plates 23, 23' opposite the centres of the caps.

In the method of construction in FIG. 13, it is possible to proceed in another way for effecting the soldering of the plates. In fact, it is possible to begin by soldering the two plates 22, 22' on the crowns of their caps, thereupon soldering the external plates 23 and 23' by a known process, such as that which consists in driving in directly gudgeons 24, on the one hand through the plate 23 and the plate 22 into the parts of the latter which form curvilinear triangles and, on the other hand, similarly into the plates 23', 22'.

In all examples described hereinbefore it has been assumed that the plates have a general plane shape but it will be understood that all that has been stated above is applicable to curved plates, such as for example the plates 26 shown in FIG. 14 of which the general shape is that of a portion of a cylindrical surface.

Whatever the shape of the plates, it is in general of interest, to modify or stagger the joints, as shown at 26a in FIG. 14, in order to obtain a more resistant assembly.

It will be understood that the invention is not in any way limited to the example described and shown, and it is capable of being modified in various ways, available to a craftsman, according to the explanations under consideration and without departing from the scope of the invention.

I claim:

A cellular construction element comprising at least two identical sheets having plain surfaces facing each other and rigidly connected in a common plane, the opposite sides of said sheets having a plurality of circular cupolas of equal radial and diametrical dimensions with their peripheral portions in touching relation and arranged in parallel rows longitudinally of the sheets, the cupolas of adjacent parallel rows having their vertical axes staggered with respect to the vertical axes of the cupolas of an adjacent row, and the rows of cupolas on one of said sheets being displaced laterally with respect to the cupolas of a companion row on the opposite sheet to provide intercommunication with each other on one sheet and with the interior of cupolas on the opposite sheet.

References Cited in the file of this patent

UNITED STATES PATENTS

| | | |
|---|---|---|
| 469,063 | Lewis | Feb. 16, 1892 |
| 662,567 | Von Lipowska et al. | Nov. 27, 1900 |
| 2,052,984 | Madison | Sept. 1, 1936 |
| 2,177,490 | Kieffer | Oct. 24, 1939 |
| 2,298,001 | Fay | Oct. 6, 1942 |
| 2,534,580 | Edwards | Dec. 19, 1950 |
| 2,738,297 | Pfistershammer | Mar. 13, 1956 |

FOREIGN PATENTS

| | | |
|---|---|---|
| 820,964 | France | Aug. 9, 1937 |
| 991,704 | France | June 27, 1951 |
| 1,045,020 | France | June 24, 1953 |
| 287,794 | Switzerland | Apr. 16, 1953 |